(12) United States Patent
Campagna et al.

(10) Patent No.: US 7,484,304 B2
(45) Date of Patent: Feb. 3, 2009

(54) CRAFT RULER WITH LASER GUIDE

(76) Inventors: Amy Campagna, 23 Carriage Dr., Oxford, CT (US) 06478; Michael E. Peterson, 303 Mailands Rd., Fairfield, CT (US) 06824; Man For (Cody) Ma, Flat C, Floor 21, Tower 4, HanFord, Garden, Castle Peak Road 333, Tuen Mun, New Territories, Hong Kong (CN); Javier Verdura, 41 Stone Manor Dr., Milford, CT (US) 06460; Evin G. Prather, 21 Adams Ave., Norwalk, CT (US) 06851

( * ) Notice: Subject to any disclaimer, the term of this patent is extended or adjusted under 35 U.S.C. 154(b) by 0 days.

(21) Appl. No.: 11/657,885

(22) Filed: Jan. 25, 2007

(65) Prior Publication Data

US 2007/0271801 A1    Nov. 29, 2007

Related U.S. Application Data

(60) Provisional application No. 60/762,230, filed on Jan. 26, 2006.

(51) Int. Cl.
*B43L 7/00* (2006.01)

(52) U.S. Cl. .................. 33/286; 33/DIG. 21; 33/485

(58) Field of Classification Search .................. 33/286, 33/456, 458, 474, 478, 479, 483, 484, 485, 33/482, 486
See application file for complete search history.

(56) References Cited

U.S. PATENT DOCUMENTS

| | | | | |
|---|---|---|---|---|
| 854,125 | A * | 5/1907 | Thompson | 33/474 |
| 1,501,713 | A * | 7/1924 | McCaffrey | 33/458 |
| 4,599,805 | A * | 7/1986 | Padilla | 33/474 |
| 5,056,230 | A * | 10/1991 | Lok | 33/30.1 |
| 5,075,977 | A * | 12/1991 | Rando | 33/DIG. 21 |
| 5,673,492 | A * | 10/1997 | Williams | 33/286 |
| 6,105,264 | A * | 8/2000 | Phillips | 33/DIG. 21 |
| 6,178,650 | B1 * | 1/2001 | Thibodeaux | 33/286 |
| 6,901,674 | B2 * | 6/2005 | Pieczynski | 33/485 |
| 2006/0000099 | A1 * | 1/2006 | Tessel et al. | 33/414 |
| 2006/0168830 | A1 * | 8/2006 | Dallman | 33/286 |
| 2006/0260146 | A1 * | 11/2006 | Manning | 33/483 |
| 2007/0144018 | A1 * | 6/2007 | Tseng | 33/32.3 |

* cited by examiner

*Primary Examiner*—G. Bradley Bennett
(74) *Attorney, Agent, or Firm*—Alix, Yale & Ristas, LLP

(57) ABSTRACT

A craft ruler employs a laser module which is longitudinally positionable along the ruler. A laser emits a beam which defines a crafting guideline on an adjacent surface. The angular position of the laser guideline may also be adjusted relative to the straight edge on the ruler. In addition, more than one ruler may be ganged together to form orthogonal lines or a grid.

17 Claims, 10 Drawing Sheets

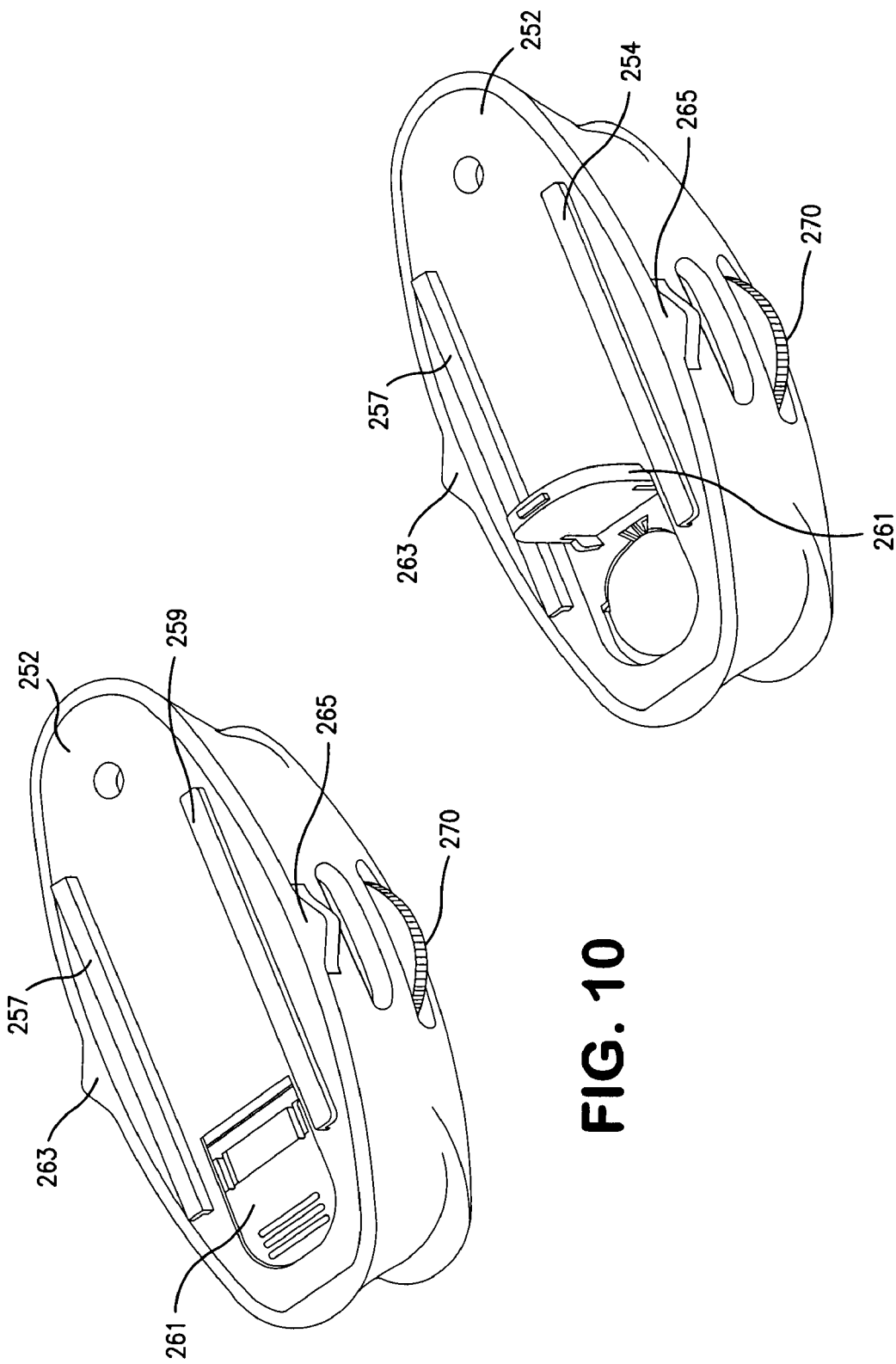

CRAFT RULER WITH LASER GUIDE

CROSS-REFERENCE TO RELATED APPLICATION

This application claims the priority of U.S. Provisional Application 60/762,230 filed on Jan. 26, 2006.

BACKGROUND

This application relates generally to rulers employed by individuals in crafting applications which allow the individuals to employ temporary straight lines for various crafting techniques.

In one application to which the invention relates, scrapbook makers desire to have perfectly measured temporary lines for writing and journaling tasks. A number of conventional products and techniques have addressed the provision of the temporary straight line feature. For example, there are numerous invisible ink pens. An advantage of the invisible ink pen is that images other than straight lines can be drawn. However, the ink dries quickly and the crafter must enter the journal at a rapid rate in order to make use of the pen. In addition, the pens eventually run out of ink or dry out.

Another product to which the invention relates is sold under the trademark Journaltopia™ by Creative Memories®. The latter writing guide employs a series of nylon loops which create a visible line which allows the writer to maintain a straight line but it is stretchable to allow letters to properly descend below the line when required. However, the writer must have a steady hand when pushing down on the nylon loops.

SUMMARY

Briefly stated, a craft ruler comprises an elongated member having a straight edge which has an associated linear measurement scale. A laser module is mounted to the member and is slidably positionable along an axis parallel to the edge. A laser is carried by the laser module and is activatable to project a light beam across an adjacent surface to provide a guideline for crafting activities. The light beam may be generally perpendicular to the axis. In addition, the light beam may be selectively angularly positionable at a wider range of angles relative to the axis. A connector at one end and a receiver at an opposite end are formed in the elongated member. A pair of rulers may be orthogonally joined in a mating relationship between the connector of one ruler and the receiver of a second ruler.

The elongated member may be a measurement ruler. The member may also be a portion of a paper trimmer. The module has a button for activating the laser. The laser is received in a carrier which is selectively angularly positionable relative to the measurement scale and the reference edge of the ruler. An indicator indicates the angle of the light beam relative to a reference edge of the ruler. A thumb wheel projects through an opening in the module and is angularly rotatable to change the angular relationship of the light beam relative to the reference edge. An indicator indicates the angle of the light beam relative to a reference edge of the ruler.

The module also includes a platform having at least one bracket with a retainer flange or tongue which engages the member for slidably retaining the module on the member. The member may have a pair of transversely spaced slots which receive portions of the retainer flanges of the platform. Portions of the slots may be enlarged to permit mounting and dismounting of the module from the member.

The ruler in one embodiment has an English scale along one edge and a metric scale along the opposite edge and the module comprises a pair of pointers which project and align with the positions along the scales. The laser projects a beam through a side of the module. The module may be dismounted, reversed and mounted to the base member to change the position of the side and reverse the direction of the projected laser beam relative to the ruler.

BRIEF DESCRIPTION OF THE DRAWINGS

FIG. 10 is a bottom perspective view of the housing module of FIG. 7;

FIG. 11 is a bottom perspective view of the housing module of FIG. 10 with a battery cover in an open position.

DETAILED DESCRIPTION OF THE PREFERRED EMBODIMENTS

Figure 1:
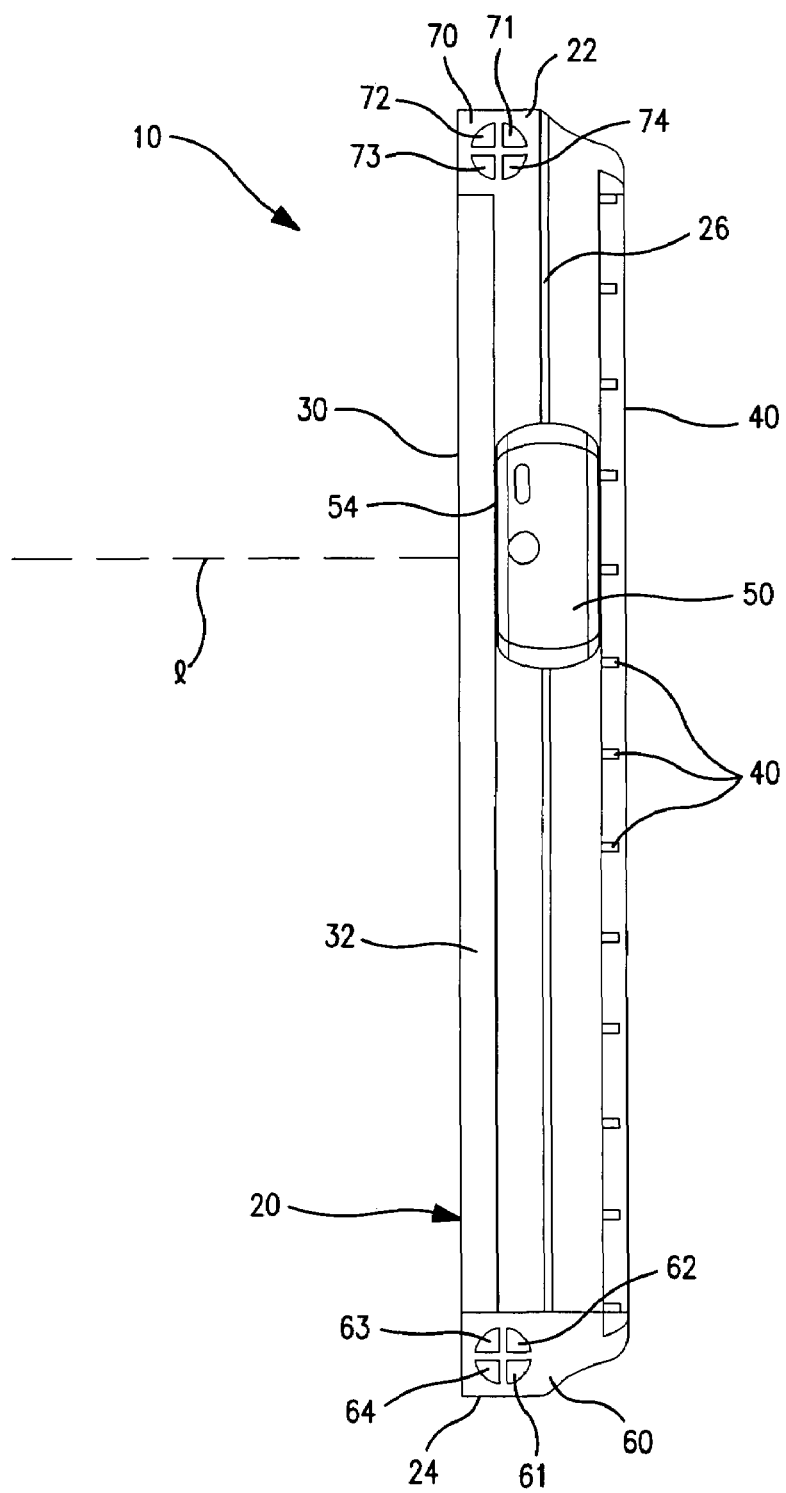
FIG. 1 is a top plan view, partly in diagrammatic form, of one embodiment of a craft ruler with laser guide.
Figure 2:
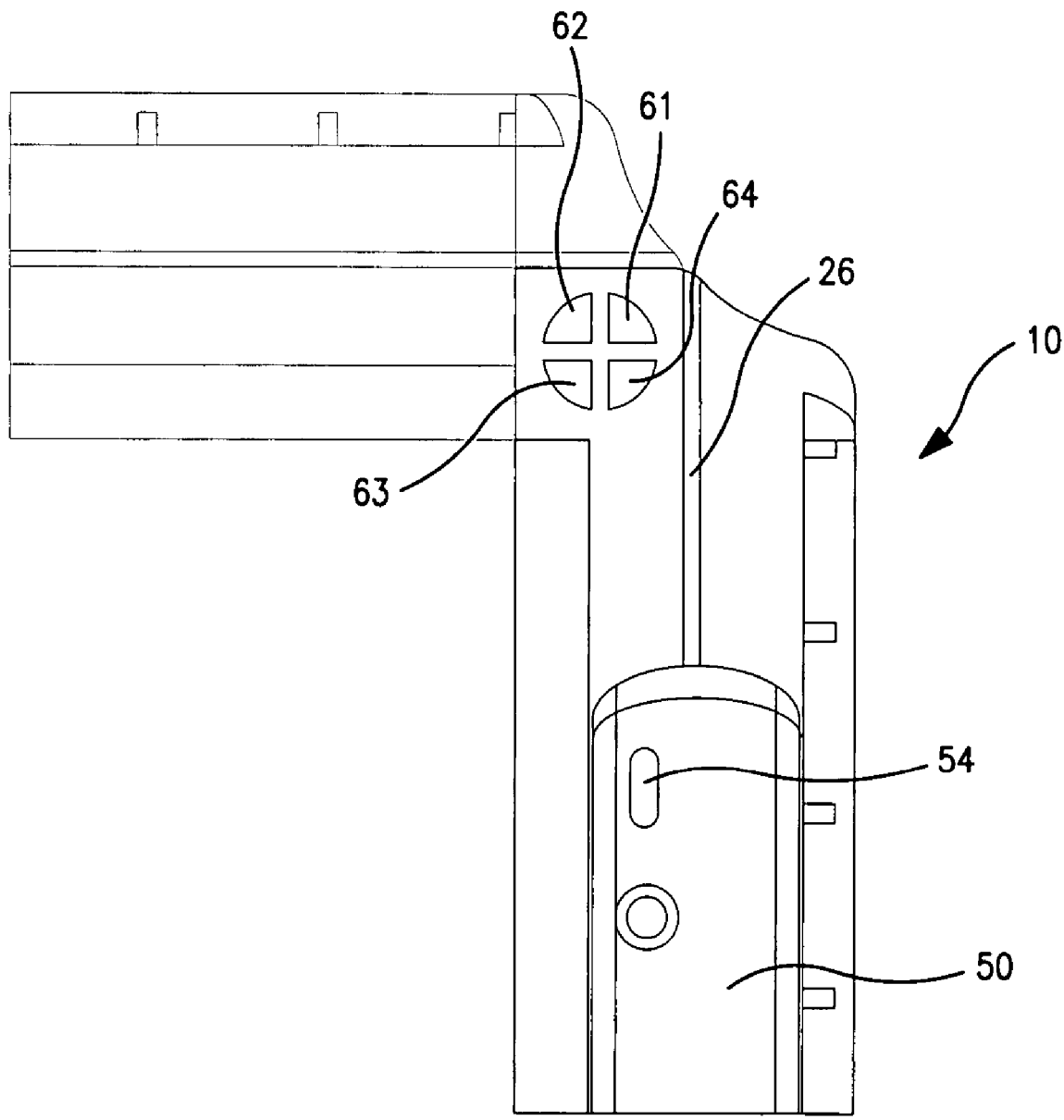
FIG. 2 is an enlarged fragmentary view of two of the craft rulers of FIG. 1 joined in an orthogonal relationship.

A craft ruler is generally designated by the numeral 10 in FIGS. 1 and 2. The ruler is an elongated member which has a base 20 which may be formed from plastic or other suitable material. The base 20 has a sculpted flattened appearance with opposed ends 22 and 24, an edge 30 which preferably has an associated measuring scale 32 and an opposing outer edge 40 which may also have a plurality of equidistantly spaced graduations 42. In one embodiment, edge 30 has an adjacent metric system scale and edge 40 has an adjacent English system scale. A central longitudinal slot 26 receives a housing module 50 which is slidably positionable therealong.

The housing module 50 houses a laser (not illustrated in FIGS. 1 and 2) which projects a thin laser beam at right angles to the edge 30 so that the beam projects a thin line l across an adjacent sheet on which the ruler rests. An on/off button 54 may be used to turn the laser beam on and off.

It will be appreciated that the housing module 50 may be selectively positioned at a desired location (for example, on the page of a scrapbook), and the laser beam projected across the page to provide a linear guide line l for journaling or other purposes. The position of the housing module, and hence the laser and generated line, may be changed as required. The ruler 10 may also be employed in other crafting activities such as quilting, etc. The ruler 10 may also be used or adapted for use for office tasks such as aligning typing, spreadsheets and other media. The laser guide feature may be employed with numerous types of rulers, paper trimmers and other related office devices and instruments.

An additional feature allows two or more of the craft rulers to be ganged or connected at end locations as desired. With additional reference to FIG. 2, a connecting boss 60 comprising four sectors 61-64 projects upwardly from one end location of the base. At a generally opposing longitudinal end of the base, a receiver 70 includes an underside recess and four sector-like sockets 71-74 which are complementary to the sector projections 60. As illustrated in FIG. 2, a second craft ruler 10 may be joined to the first craft ruler by snapping the interlock sectors into the socket openings so that the boss and receiver mate to orthogonally join the rulers. The laser housing module (not illustrated) for the horizontal (top) ruler may be selectively positioned and the laser activated to form a temporary margin line as required. It should also be appreciated that three or four of such craft rulers 10 may be ganged together to form a rectangular grid.

Figure 3:
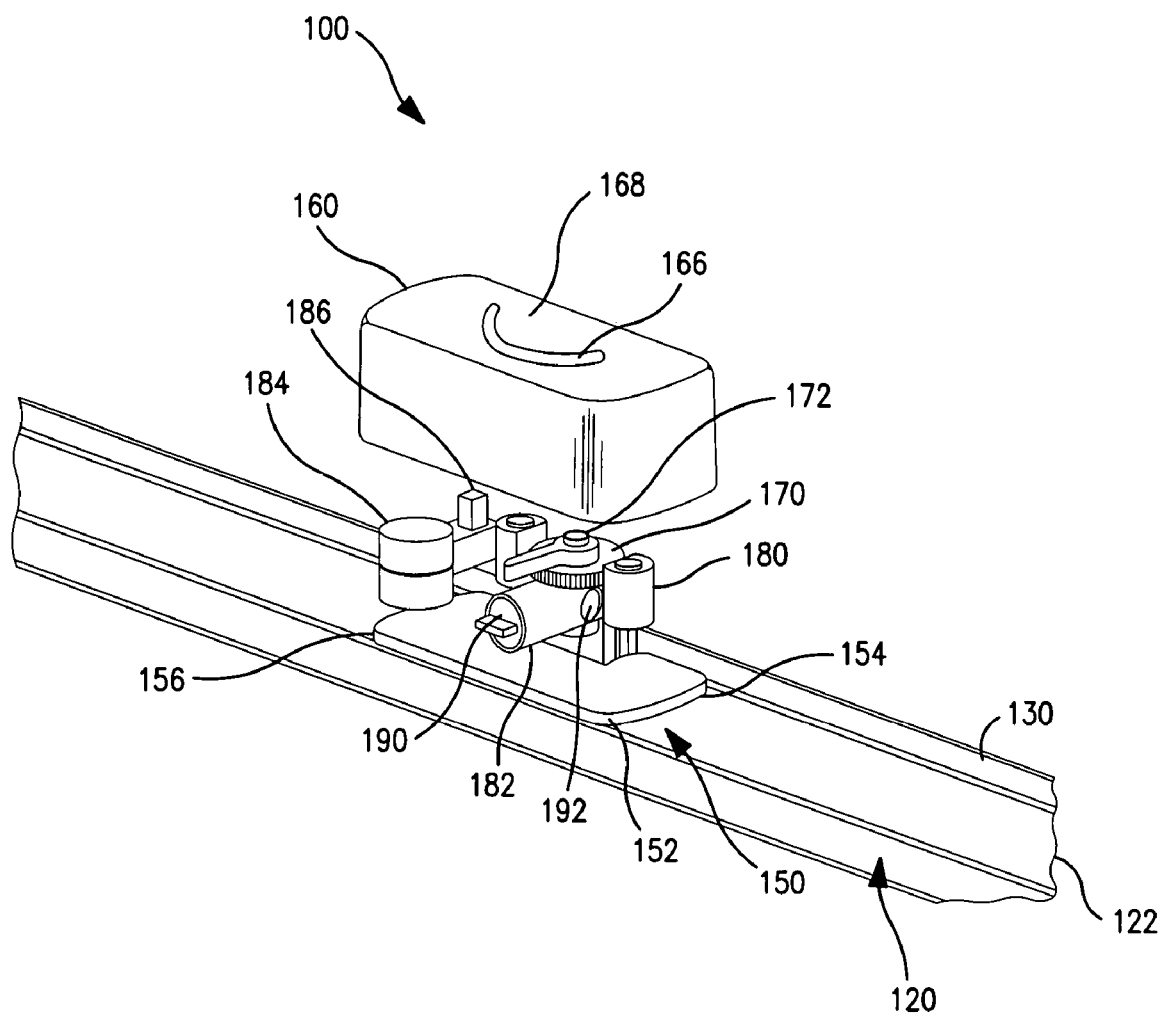
FIG. 3 is an exploded fragmentary view, partly in schematic, of a portion of a second embodiment of craft ruler.
Figure 4:
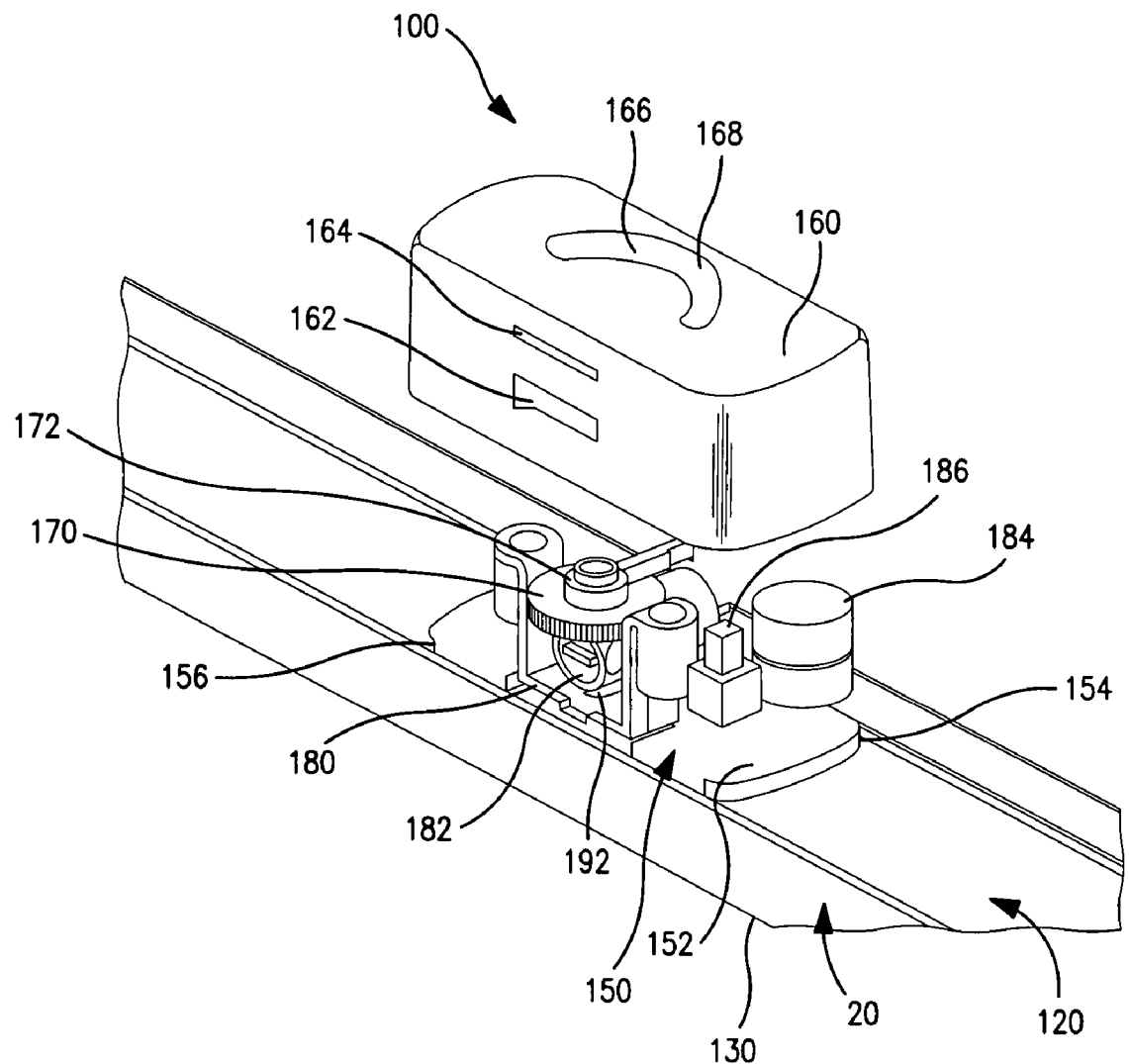
FIG. 4 is an exploded fragmentary view, partly in schematic, of the craft ruler of FIG. 3 from a generally opposite location thereof.
Figure 5:
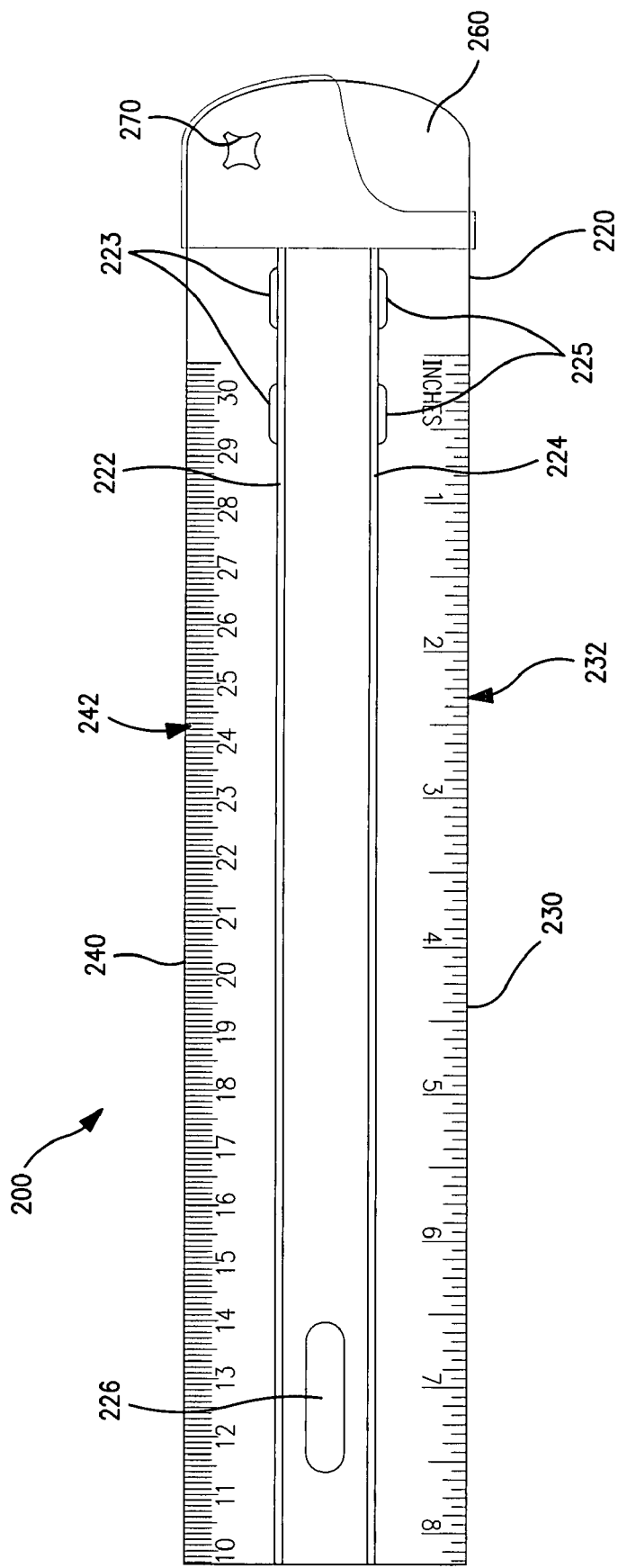
FIG. 5 is a fragmentary enlarged view, portions removed, of a third embodiment of a craft ruler from a top portion thereof.
Figure 6:
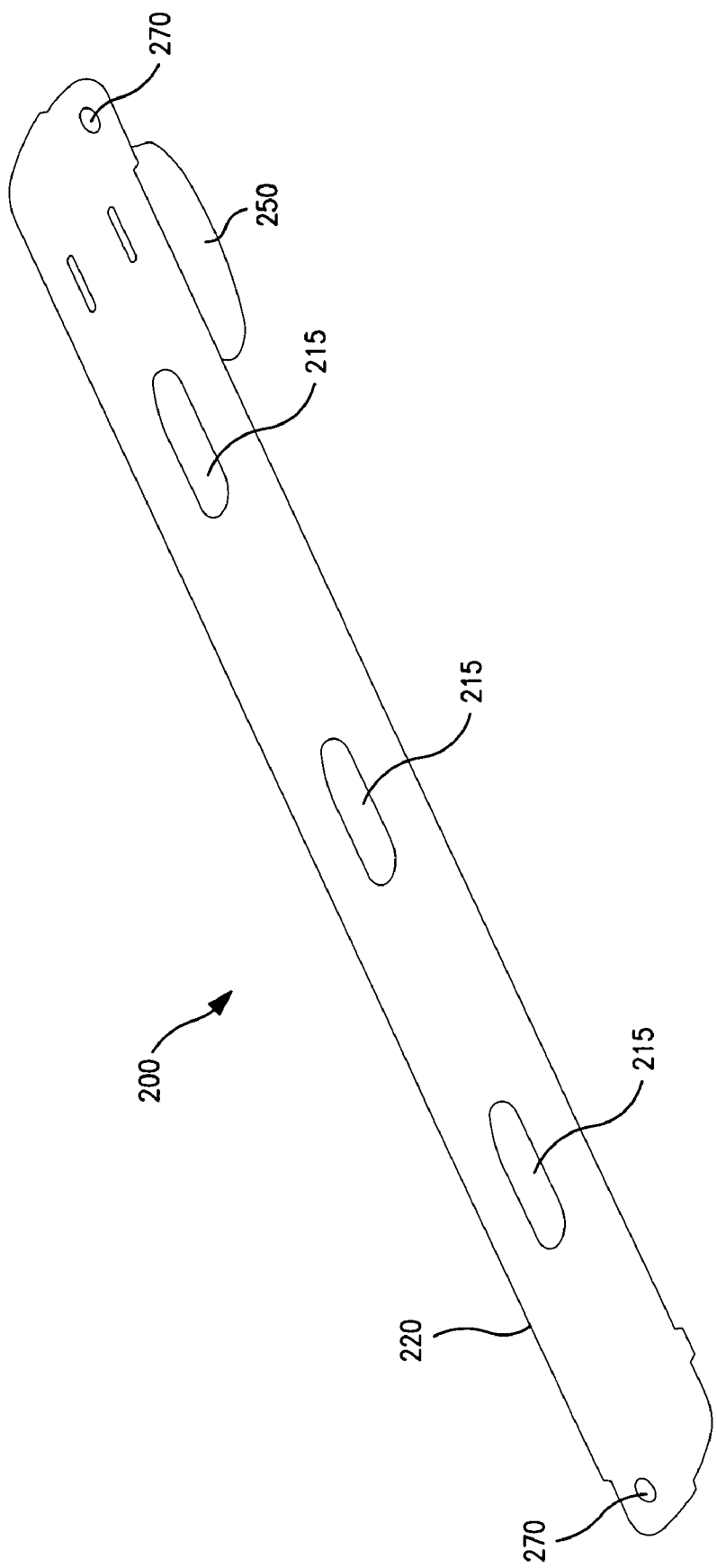
FIG. 6 is a bottom plan view of the craft ruler of FIG. 5.
Figure 7:
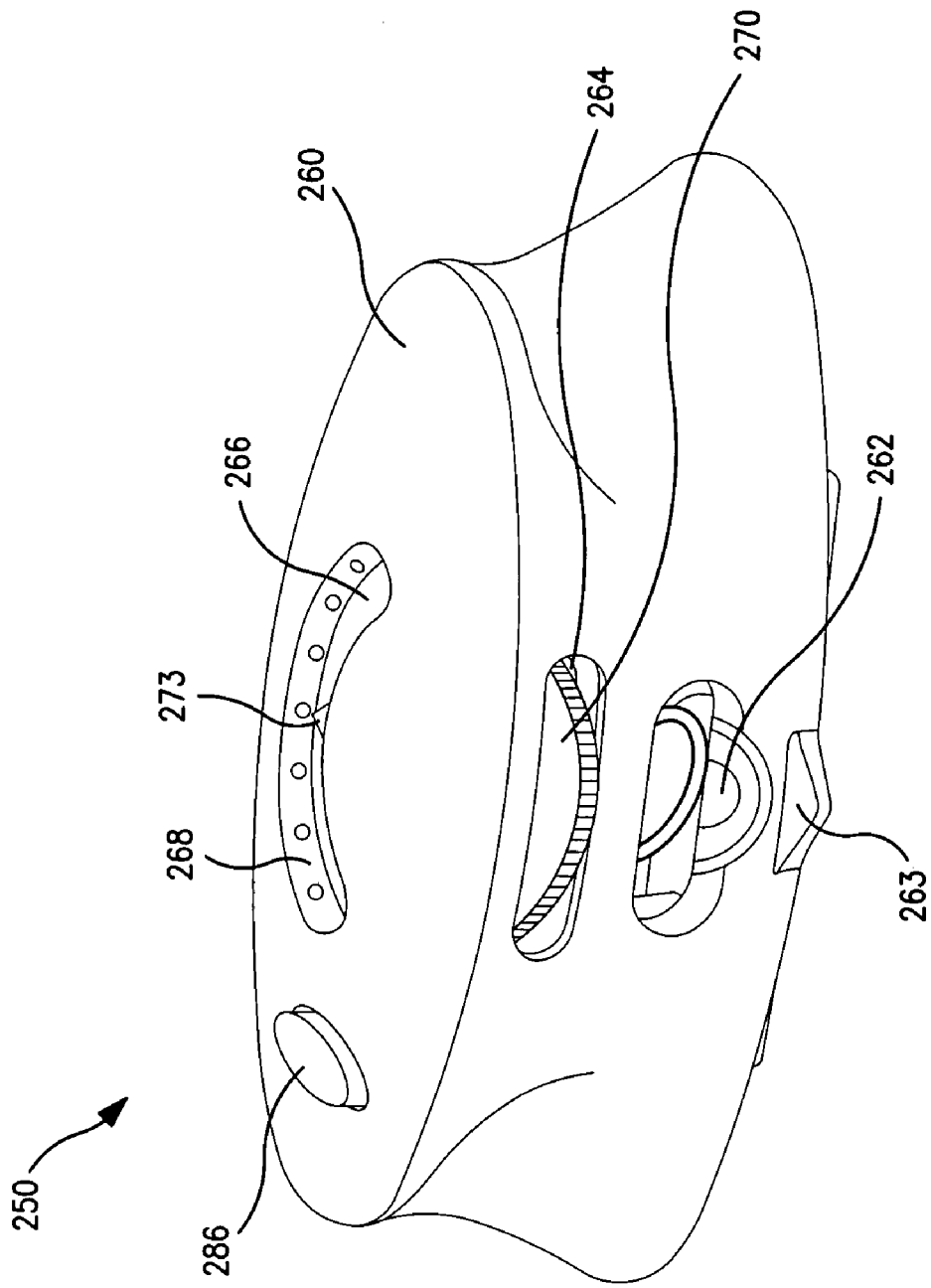
FIG. 7 is an enlarged perspective view of a housing module for the craft ruler of FIG. 5.

A second embodiment of a craft ruler is generally designated by the numeral 100 in FIGS. 3 and 4. In this embodiment, base 120 forms a central, longitudinal channel-like track 122 which receives a platform 152 for the movable housing module 150. The platform is retained to the track by a groove and tongue or retainer flange connection 154, 156 at the opposite sides or by other suitable means. A housing cover 160 is a molded member which mounts over the platform 152 and encloses the various components as further described below.

The platform 152 mounts or forms a bracket 180 which forms a laser diode holder 182 for the laser 190. Laser 190 may be an ECO laser diode. Numerous lasers may be suitable. A lens 192 also covers the output end of the laser. A battery 184 is also retained with the platform. An on/off switch 186 is mounted to the platform and is accessible through the housing cover 160 for activating/deactivating the laser 190.

One side of the housing cover 160 forms a laser window 162 and an upper opening 164 above the window. The top of the housing has an arcuate recess 166 which spans an angle of 135° and may be marked with an angular scale 168 (not fully shown) centered on 0°. A thumbnail 170 in the form of a serrated wheel projects through the opening 164 to allow the angle of the laser to be selectively manually pivoted for positioning at various angles including the perpendicular angle to the linear rule. In a preferred form the beam may be positioned between 45° on each side of the perpendicular. An indicator 172 angularly fixed to the thumbnail 170 aligns with the scale 168 to indicate the angle of the laser 190 and the resulting line l.

In one embodiment pointers integrally extend from the housing cover 160 to indicate the laser position relative to the measurement scales at the opposed edges 30 and 40. The entire housing module 150 may be rotated 180° so that the craft ruler is easily adaptable for left-hand or right-hand usage as desired.

With reference to FIGS. 5-12, another embodiment of a craft ruler is generally designated by the numeral 200. The craft ruler base 220 is molded and has at each end a generally cross-shaped projection of connecting boss 260 and an opposing complementary shaped recess of receiver 270. The boss 260 of one ruler engages in the receiver 270 of a second ruler to provide for perpendicular multiple craft ruler joining as previously described.

The craft ruler 200 has a longitudinally extending, graduated English measurement scale 232 and a graduated metric system measurement scale 242 along respective edges 230 and 240, respectively. A pair of longitudinally extending slots 222 and 224 at their lower extreme underside edges form grooves for slidably receiving integral mounting brackets of the housing module 250. The underside of one preferred form of the platform 252 of the housing model (FIG. 12) employs a transversely spaced pair of L-shaped brackets with longitudinally spaced flanges or tongues 251 and 253. Upper portions of the brackets are received in the slots 222 and 224. The tongues 251 and 253 mate with the respective grooves, and the platform underside engages the base 220 to retainably mount the module 250 to the ruler base and to provide sliding movement therealong. The base also may have a central longitudinal channel 226 which receives a pair of locating projections 255. One end of the longitudinal slots 222 and 224 has pair of enlarged lobes 223 and 225 which are located and dimensioned to receive the tongues 251 and 253 of the housing module 250 to permit easy mounting and dismounting of the housing module from the ruler base 220.

The underside of the ruler base 220 may have longitudinally spaced pads 215 to provide a non-slip surface at the underside of the ruler base (FIG. 6) to prevent slippage during usage. FIGS. 10 and 11 illustrate a platform underside wherein single elongated brackets 257 and 259 at each side are respectively received in the slots 251 and 253 and have flanges which retain and mount the housing module to the ruler base. In addition, a battery cover 261, which may be opened as shown in FIG. 11, is also positioned at the underside of the housing module platform. A battery 284 (FIGS. 8 and 9) is contained in a package which is accessible at the underside by pivotally opening the battery cover 261.

Figure 12:
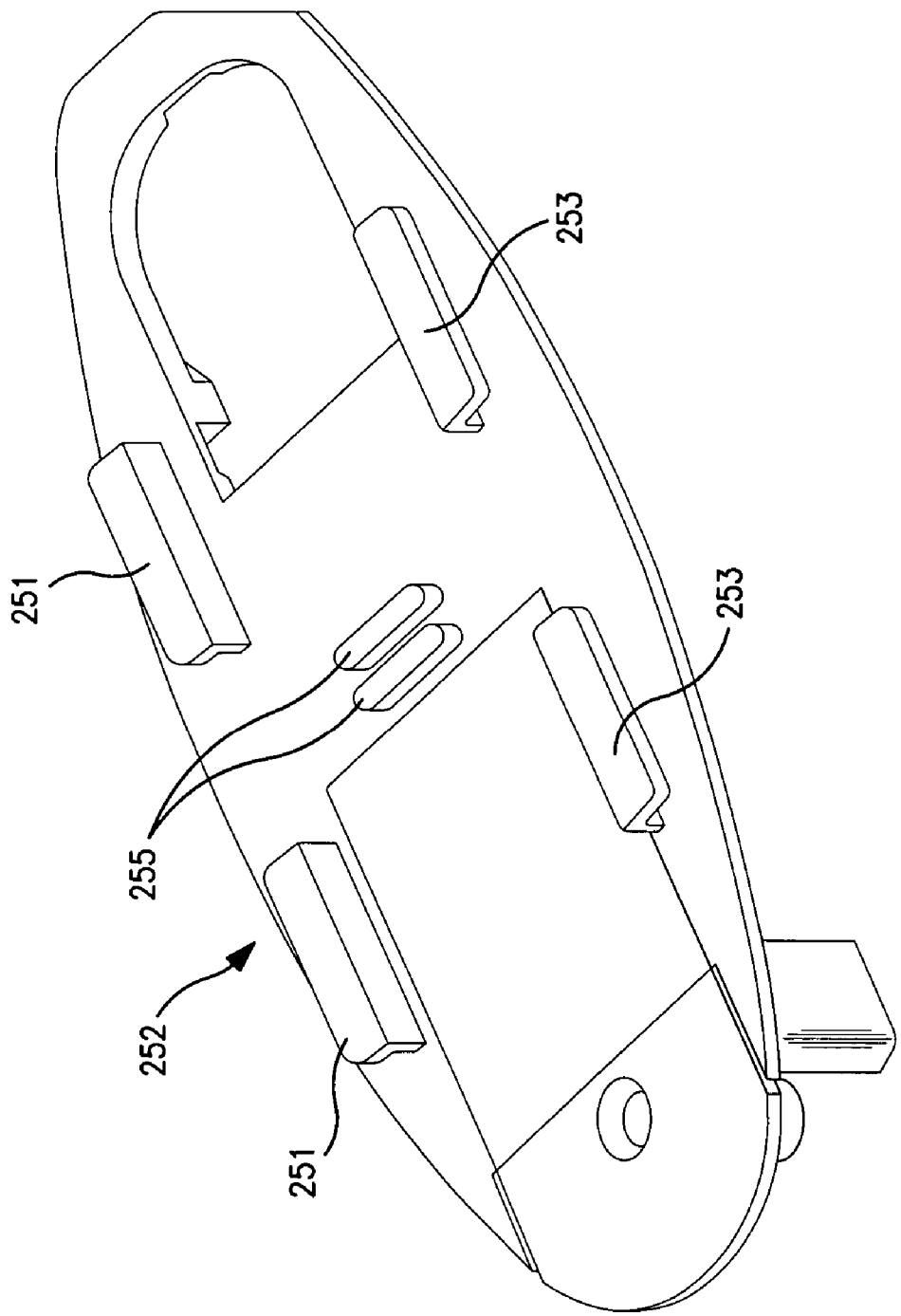
FIG. 12 is a bottom perspective view of a modified embodiment of a bottom portion of the housing with the battery cover removed.

With additional reference to FIG. 12 housing module 250 has a housing cover 260 which has a smooth sculpted appearance to facilitate manual positioning. At lower opposing locations, the cover includes a pair of pointers 263 and 265 which integrally extend to align with graduations along the measuring scales 232 and 242. Thus, the module and the projected laser beam which forms the guideline may be precisely positioned on the adjacent surface. The upper portion of the housing includes an arcuate recess 266. Arcuate recess 266 is surrounded by an adjacent angular scale 268. An on/off switch 286 also projects through the top of the housing cover.

Figure 8:
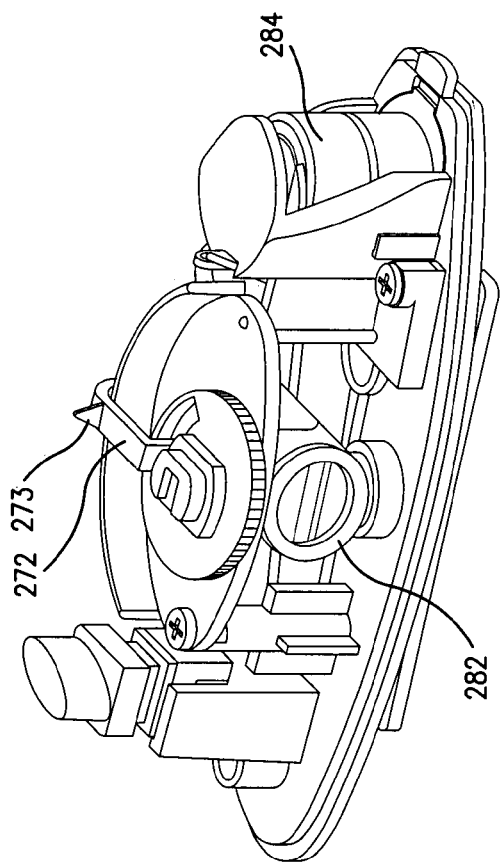
FIG. 8 is a perspective view of the housing module of FIG. 7 with the cover removed.
Figure 9:
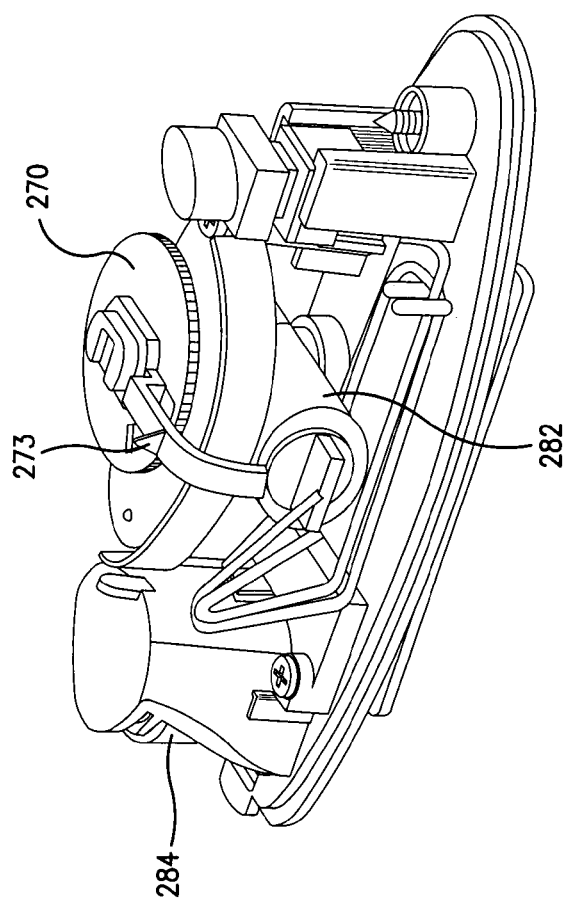
FIG. 9 is an opposing perspective view of the housing module of FIG. 8.

One side of the housing has a laser window 262 which may include a lens. A thumbnail 270 projects through an opening 264 above the laser window 262. The laser emits a narrow beam through the laser window to form a well-defined line on an adjacent surface. As best illustrated in FIGS. 8 and 9, a diode holder 282 is rotatably fixed for rotation with the thumbnail 270 and an indicator arm 272 having a pointer 273. The angular position of the laser and projected beams relative to the edge may thus be manually determined by angular pivoting the thumbnail 270. The position of the pointer 273 in relation to scale 268 indicates the angular position of the line relative to the straight edge 230 or 240.

While preferred embodiments of the craft ruler have been described, the foregoing descriptions should not be deemed a limitation of the invention herein.

What is claimed:

1. A craft ruler comprising:
   an elongated member having a first and second side and a straight edge with an associated linear measurement scale disposed on said first side and said second side configured to rest in a stable state on a planar surface so that said edge engages or is parallel to said surface;
   a laser module mounted to said member above said first side and slidably positionable along an axis parallel to said edge when said member rests on said planar surface; and a laser carried by said laser module and activatable to project a light beam across an adjacent surface portion when said member rests on said planar surface.

2. The craft ruler of claim 1 wherein said light beam is generally perpendicular to said axis.

3. The craft ruler of claim 1 wherein said light beam is selectively angularly positionable at a wide range of angles relative to said axis.

4. The craft ruler of claim 1 wherein said elongated member further comprises a connector at one end and a receiver at an opposite end.

5. In combination:
a pair of rulers as recited in claim 4 wherein said rulers are orthogonally joined in a mating relationship between a connector of one ruler and a receiver of a second ruler and said ruler second sides are configured concurrently to rest on a planar surface.

6. The craft ruler of claim 1 wherein said module has a button for activating the laser.

7. The craft ruler of claim 1 wherein said laser is received in a carrier which is selectively angularly positionable relative to said edge.

8. The craft ruler of claim 7 further comprising a thumb wheel projecting through an opening in said module and angularly rotatable to change the angular relationship of said light beam relative to said edge.

9. The craft ruler of claim 1 wherein said module includes a platform having at least one retainer flange which engages said member for slidably retaining said module with said member.

10. The craft ruler of claim 9 wherein said member has a pair of transversely spaced elongated slots.

11. A laser guide device comprising:
a member defining a linear reference;
a laser module mounted to said member by a pair of brackets which are received in a pair of parallel slots to slidably engage said member and module and said slots have an enlarged portion, said laser module being linearly positionable relative to said reference; and
a laser carried by said module to project a light beam through a module side across a surface adjacent to said member wherein said module may be positioned relative to said enlarged portions to permit said module to be dismounted, reversed and mounted to said member to change the position of said module side relative to said member.

12. The laser guide device of claim 11 wherein the member is a ruler.

13. The laser guide device of claim 12 wherein the member is a portion of a paper trimmer.

14. The laser guide device of claim 12 wherein the ruler has an English scale along one edge and a metric scale along the opposite edge And said module comprises a pair of pointers which project and align with positions along said scales.

15. The laser guide device of claim 11 wherein said laser may be positioned to change the angle of the light beam relative to said linear reference.

16. The laser guide device of claim 15 further comprising a thumb wheel which pivots with said laser and projects through the housing to permit manual rotation.

17. The laser guide device of claim 16 further comprising an indicator which indicates the angle of the light beam.

* * * * *